E. E. THOMAS.
NUT LOCK.
APPLICATION FILED JAN. 16, 1917.

1,322,972.

Patented Nov. 25, 1919.

Edwin E. Thomas
Inventor,
By
Atty.

UNITED STATES PATENT OFFICE.

EDWIN E. THOMAS, OF PORTLAND, OREGON, ASSIGNOR TO H. O. TENNEY, OF PORTLAND, OREGON.

NUT-LOCK.

1,322,972.      Specification of Letters Patent.      Patented Nov. 25, 1919.

Application filed January 16, 1917. Serial No. 142,650.

*To all whom it may concern:*

Be it known that I, EDWIN E. THOMAS, a citizen of the United States, residing in the city of Portland, county of Multnomah, and State of Oregon, have invented certain new and useful Improvements in Nut-Locks, of which the following is a specification.

The principal object of my invention is to provide an extremely simple, practical and economical nut lock, adapted to be applied to a bolt having a nut thereon, without the use of special tools or parts other than are used for tightening the nut on said bolt, and which, when so applied, will effectively hold the nut against working loose. Another object of my invention is to provide a nut lock made of thin sheet steel, which can be stamped out of the sheet material at great speed and at a low cost.

In order to explain my invention I have illustrated one practical embodiment thereof on the accompanying sheet of drawings, which I will now describe.

Referring more in detail to the drawings, 1 designates a bolt, 2 a nut, and 3 my improved nut lock applied thereto. My nut lock is made of spring sheet steel and is of washer-like form, the outer periphery of which may be of any desired form to comply with the form of the nut with which it is to be used. In the form here shown it is round with a series of notches, as 4, cut therein. The center of the nut lock is punched out so as to provide a main center hole with one or more cut-out notches, as 5, opening thereinto, any one of said notches forming a means for crossing a thread as said nut lock is screwed thereon, thus making it possible for the nut lock though of substantially the same thickness as one of the threads of the bolt, to be screwed on to the bolt, one end or a corner of the notch 5, moving above a thread, and the other end or corner of said notch moving below said thread. In other words, said nut lock crosses a thread at a notch in such a way that one end or corner of a notch bears down on the upper side of a thread, while the opposite end, or corner, of said notch bears upwardly against the under side of the same thread. Thus as said nut lock is tightened on to a bolt it is flexed by engagement with the nut in such a way as to cause said corners to bite against the under and upper sides of the thread, and any attempt to turn said nut lock in either direction causes the corners, or shoulders, of the notch which crosses the thread to cut into the thread and thus makes it impossible for the nut lock to turn without the application of power thereto.

Figure 1:
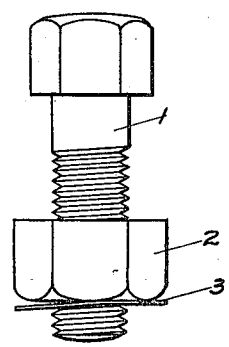
Figure 1 is a side elevation of a bolt and nut with my nut lock applied thereto.
Figure 2:
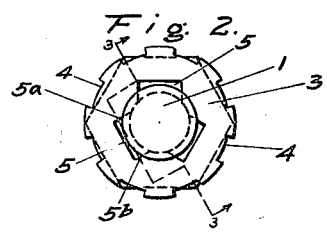
Fig. 2 is a bottom, end view thereof.
Figure 3:
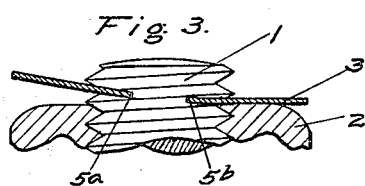
Fig. 3 is an enlarged, fragmentary, sectional view, taken on line 3—3 of Fig. 2.

Referring to Figs. 2 and 3, we will assume that the notch 5, at the lower left hand side of the center hole, is the one which crosses a thread. Its corner $5^a$, therefore, would be above a thread and its corner $5^b$, would be below the same thread, shown in Fig. 3, in which figure said nut lock is shown to be tightened down upon the nut 2. Any attempt to turn said nut lock in one direction will cause the corner or the shoulder $5^a$, of the notch 5, to bite, or gouge, in the top side of the thread while any attempt to turn it in the opposite direction will cause the opposite end, or corner, $5^b$, of said notch to bite into the under side of the thread, thus preventing the nut from being turned except by means of a wrench or other suitable tool.

Attention is called to the fact that the nut locks are of continuous washer-like form, and that a notch, or off-set, in the center bore thereof is made for the purpose of crossing a thread, thus avoiding the necessity of splitting the nut lock out through one side.

What I claim as new and desire protection for is,—

The combination with a threaded bolt and a nut thereon, of a thin-sheet steel washer having a central opening therein of less diameter than said bolt, and a plurality of rectangular openings extending into the body of said washer from said opening, said openings having parallel sides at a space apart, whereby to provide angular portions projecting between the threads of said bolt, said rectangular openings extending radially slightly beyond the diameter of said bolt, whereby to permit said angular portions to project between different threads, substantially as and for the purpose described.

Signed at Portland, Multnomah county, Oregon, this 2nd day of January, 1917.

EDWIN E. THOMAS.

In presence of—
I. M. GRIFFIN,
J. C. STRENG.